(12) United States Patent
Kela et al.

(10) Patent No.: US 10,143,032 B2
(45) Date of Patent: Nov. 27, 2018

(54) CONTENTION-BASED DATA TRANSMISSION

(71) Applicant: Huawei Technologies Co., Ltd., Shenzhen (CN)

(72) Inventors: Petteri Kela, Helsinki (FI); Henrik Lundqvist, Kista (SE); George Koudouridis, Kista (SE); Henrik Olofsson, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/299,076

(22) Filed: Oct. 20, 2016

(65) Prior Publication Data

US 2017/0041981 A1 Feb. 9, 2017

Related U.S. Application Data

(63) Continuation of application No. PCT/EP2014/065489, filed on Jul. 18, 2014.

(51) Int. Cl.
*H04Q 7/00* (2006.01)
*H04W 76/27* (2018.01)
(Continued)

(52) U.S. Cl.
CPC ........... *H04W 76/27* (2018.02); *H04W 28/14* (2013.01); *H04W 72/00* (2013.01);
(Continued)

(58) Field of Classification Search
CPC ..... H04W 72/04; H04W 76/02; H04W 84/08; H04W 28/04; H04W 8/26
(Continued)

(56) References Cited

U.S. PATENT DOCUMENTS

2009/0116434 A1 5/2009 Lohr et al.
2009/0201868 A1* 8/2009 Chun ................ H04W 72/1278
370/329
(Continued)

FOREIGN PATENT DOCUMENTS

JP 2011041159 A 2/2011
JP 2011155336 A 8/2011
(Continued)

OTHER PUBLICATIONS

"3rd Generation Partnership Project; Technical Specification Group Core Network; Support of Localised Service Area (SoLSA); Stage 2 (Release 1999)," 3GPP TS 23.073, V4.0.0, pp. 1-25, 3rd Generation Partnership Project, Valbonne, France (Mar. 2001).
(Continued)

*Primary Examiner* — Dai A Phuong
(74) *Attorney, Agent, or Firm* — Leydig, Voit & Mayer, Ltd.

(57) ABSTRACT

The present invention relates to a user device and a network node. Furthermore, the present invention also relates to corresponding methods, a computer program, and a computer program product. A Radio Network Temporary Identifier (RNTI) is assigned to a User Device from a radio communication network, wherein the assigned RNTI is valid for a plurality of network nodes of the radio communication network and associated with a common data channel of the radio communication network.

19 Claims, 4 Drawing Sheets

(51) Int. Cl.
- *H04W 72/00* (2009.01)
- *H04W 28/14* (2009.01)
- *H04W 72/04* (2009.01)
- *H04W 72/14* (2009.01)
- *H04W 88/02* (2009.01)

(52) U.S. Cl.
CPC ....... *H04W 72/0446* (2013.01); *H04W 72/14* (2013.01); *H04W 88/02* (2013.01)

(58) Field of Classification Search
USPC .... 455/432.1, 435.1, 436–453, 456.1–456.3; 370/329–334
See application file for complete search history.

(56) References Cited

U.S. PATENT DOCUMENTS

| | | | |
|---|---|---|---|
| 2011/0098053 A1* | 4/2011 | Widegren | H04W 8/26 455/450 |
| 2011/0218016 A1* | 9/2011 | Hirakawa | H04B 7/024 455/524 |
| 2011/0222501 A1 | 9/2011 | Kim et al. | |
| 2011/0256879 A1* | 10/2011 | Chun | H04W 72/042 455/450 |
| 2012/0127141 A1 | 5/2012 | Choi et al. | |
| 2012/0157141 A1* | 6/2012 | Lim | H04W 74/08 455/509 |
| 2012/0195273 A1 | 8/2012 | Iwamura et al. | |
| 2012/0294270 A1 | 11/2012 | Yamada et al. | |
| 2012/0307767 A1* | 12/2012 | Yamada | H04W 74/02 370/329 |
| 2013/0279465 A1* | 10/2013 | Timner | H04W 74/006 370/329 |
| 2014/0133430 A1* | 5/2014 | Yang | H04L 1/1854 370/329 |
| 2014/0185569 A1* | 7/2014 | Suzuki | H04L 1/1854 370/329 |
| 2014/0192734 A1* | 7/2014 | Ng | H04L 5/0035 370/329 |
| 2014/0313969 A1* | 10/2014 | Kalhan | H04W 36/0072 370/312 |
| 2014/0321391 A1 | 10/2014 | Zhang et al. | |
| 2015/0009931 A1 | 1/2015 | Yamazaki | |
| 2015/0043490 A1* | 2/2015 | Wu | H04W 8/26 370/329 |
| 2015/0172034 A1 | 6/2015 | Kishiyama et al. | |
| 2016/0014628 A1* | 1/2016 | Kim | H04W 24/10 370/329 |
| 2016/0366719 A1* | 12/2016 | Yamada | H04W 76/025 |
| 2017/0019930 A1* | 1/2017 | Lee | H04W 74/0833 |
| 2017/0231029 A1* | 8/2017 | Pelletier | H04W 76/046 |

FOREIGN PATENT DOCUMENTS

| | | |
|---|---|---|
| JP | 2012213206 A | 11/2012 |
| JP | 2013502163 A | 1/2013 |
| JP | 2014027429 A | 2/2014 |
| WO | 2013074457 A1 | 5/2013 |
| WO | 2013122164 A1 | 8/2013 |
| WO | 2013169073 A1 | 11/2013 |

OTHER PUBLICATIONS

"3$^{rd}$ Generation Partnership Project; Technical Specification Group Services and System Aspects; Study on Machine-Type Communications (MTC) and other mobile data applications communications enhancements (Release 12)," 3GPP TR 23.887, V12.0.0, pp. 1-151, 3$^{rd}$ Generation Partnership Project, Valbonne, France (Dec. 2013).

"3$^{rd}$ Generation Partnership Project; Technical Specification Group Radio Access Network; Physical channels and mapping of transport channels onto physical channels (FDD) (Release 11)," 3GPP TS 25.211, V11.5.0, pp. 1-63, 3$^{rd}$ Generation Partnership Project, Valbonne, France (Jun. 2014).

"3$^{rd}$ Generation Partnership Project; Technical Specification Group Radio Access Network; Radio Interface Protocol Architecture (Release 11)," 3GPP TS 25.301, pp. 1-53, 3$^{rd}$ Generation Partnership Project, Valbonne, France (Sep. 2012).

* cited by examiner

CONTENTION-BASED DATA TRANSMISSION

CROSS-REFERENCE TO RELATED APPLICATIONS

This application is a continuation of International Application No. PCT/EP2014/065489, filed on Jul. 18, 2014, the disclosure of which is hereby incorporated by reference in its entirety.

TECHNICAL FIELD

The present invention relates to a user device and a network node for wireless communication systems. Furthermore, the present invention also relates to corresponding methods, a computer program, and a computer program product.

BACKGROUND

In Evolved Packet System (EPS) or Long Term Evolution (LTE) the mobility and session initiation mechanisms are inefficient for single data packets due to setup and rerouting of tunnels, delay for Authentication, Authorization and Accounting (AAA), user equipment (UE) context fetch, etc.

The network traffic is also getting increasingly diverse with many applications sending small data packets at long time intervals. The current connection oriented solution is not designed for such traffic, which results in a rapid increase in signalling within the communication networks and energy consumption for the user devices connected to the radio network.

SUMMARY

An objective of embodiments of the present invention is to provide a solution which mitigates or solves the drawbacks and problems of conventional solutions.

Another objective of the present invention is to provide improved contention based data transmissions for wireless communication system.

The above and other objectives are solved by the subject matter of the independent claims. Further advantageous implementation forms can be found in the dependent claims.

According to a first aspect of the invention, the above mentioned and other objectives are achieved with a user device for a wireless communication system, the user device comprising a transceiver configured to receive an assigned Radio Network Temporary Identifier (RNTI) from a radio communication network, wherein the assigned RNTI is valid for a plurality of network nodes of the radio communication network and associated with a common data channel of the radio communication network;

transmit data to or receive data from the radio communication network, on the common data channel using the assigned RNTI.

According to the user device of the first aspect, by using an assigned RNTI, which is valid for a plurality of network nodes and associated with a common data channel, contention based transmissions are possible for the user device. This is especially advantageous for applications transmitting small data packets in irregular time intervals.

A common data channel in this disclosure means a shared data channel which is not dedicated to a specific user device and can be used by two or more user devices.

The plurality of network nodes may be associated with corresponding cells in cellular communication systems, such as LTE. However, one-to-one mapping between a network node and a cell is not necessary even though this is possible.

Moreover, an "or" in this disclosure and the corresponding claims is to be understood as a mathematical OR which covers "and" and "or", and is not to be understand as an XOR (exclusive OR).

In a first possible implementation form of the user device according to the first aspect as such, the transceiver is further configured to receive a radio resource message from the radio communication network, wherein the radio resource message indicates specific time-frequency radio resources of the common data channel;

transmit data to or receive data from the radio communication network, on the indicated specific time-frequency radio resources.

The first implementation form of the first aspect has the advantage that the user device knows exactly which radio resources of the common data channel to use.

In a second possible implementation form of the user device according to the first implementation form of the first aspect, the transceiver is further configured to transmit a radio resource request message to the radio communication network, wherein the radio resource request message indicates requested radio resources; and receive the radio resource message from the radio communication network in response to transmitting the radio resource request message.

The second implementation form of the first aspect has the advantage that the user device can signal to the radio communication network radio resources needed for contention based transmissions with the common data channel.

In a third possible implementation form of the user device according to any of the implementation forms of the first aspect or the first aspect as such, the common data channel is a dedicated non-scheduled common data channel.

The third implementation form of the first aspect has the advantage that the user devices can freely use the common data channel and decide when to use the common data channel. Further, it has the advantage that no scheduling from network side is needed.

In a fourth possible implementation form of the user device according to any of the implementation forms the of first aspect or the first aspect as such, the transceiver is further configured to transmit a transmission mode message to the radio communication network, wherein the transmission mode message indicates that the user device requests to transmit data to or receive data from the radio communication network, on the common data channel using the assigned RNTI.

The fourth implementation form of the first aspect has the advantage that the user device can control or at least indicate that the user device prefers to transmit on the common data channel using the assigned RNTI, e.g. for saving energy.

In a fifth possible implementation form of the user device according to any of the implementation forms of the first aspect or the first aspect as such, the user device further comprises a dedicated buffer, and wherein the transceiver is further configured to use the dedicated buffer for storing data before transmission on the common data channel using the assigned RNTI.

The fifth implementation form of the first aspect has that non-time/error critical data can be separated from time/error critical data in different buffers and the non-time/error critical data can use the common data channel with the assigned RNTI for contention based transmissions. Thereby, also scheduling request and buffer status updates can be omitted with the use of the dedicated buffer.

In a sixth possible implementation form of the user device according to any of the implementation forms of the first aspect or the first aspect as such, the transceiver is further configured to receive a RNTI control message from the radio communication network, wherein the received RNTI control message indicates one or more instructions in the group comprising: maintain the assigned RNTI, renew the assigned RNTI, and release the assigned RNTI; and maintain, renew or release the assigned RNTI according to the indication in the received RNTI control message.

The sixth implementation form of the first aspect has the advantage that network node(s) can have better control over the assigned RNTIs by using RNTI control messages.

In a seventh possible implementation form of the user device according to any of the implementation forms of the first aspect or the first aspect as such, the transceiver is further configured to transmit data to or receive data from the radio communication network when being connected to the radio communication network (e.g. to one or more network nodes of the radio communication network);

release the connection to the radio communication network; and transmit data to or receive data from the radio communication network, on the common data channel using the assigned RNTI, when not being connected to the radio communication network anymore.

When the user device is connected to the radio communication network, it typically has resources assigned, which can be used by the user device for communicating with the network nodes of the radio communication network. The connected mode is the only mode in which unicast data transfer/transmission to or from the user device is possible. After the release of the connection, theses resources are not assigned anymore to the user device and the user device, therefore cannot use these resources anymore. However, by maintaining the assigned RNTI even after the release of the connection between user device and radio communication network, it can be achieved that a (contention based) communication between the user device and (the network nodes of) the radio communication network is still possible using the RNTI and the common data channel.

The seventh implementation form of the first aspect enables the user device to create a connection, get identification (the RNTI) needed for data transmissions and utilize the common data channel with the assigned RNTI in non-connected mode. Thereby, e.g. energy saving is possible since transmissions in connected mode consumes more power. Furthermore, with this implementation form it can be achieved, that even after the release of a connection (such as a Radio Resource Control (RRC) connection) between the user device and a network node, the user device is still able to communicate with the radio communication network (using the assigned RNTI) in a contention based manner.

According to a second aspect of the invention, the above mentioned and other objectives are achieved with a network node for a wireless communication system, the network node comprising a transceiver and a processor; wherein the processor is configured to assign a Radio Network Temporary Identifier (RNTI) to a user device, wherein the RNTI is valid for a plurality of network nodes of a radio communication network and associated with a common data channel of the radio communication network; and wherein the transceiver is configured to transmit the assigned RNTI to the user device, transmit data to or receive data from the user device, on the common data channel using the assigned RNTI for identifying the user device.

According to the network node of the second aspect, by assigning a RNTI which is valid for a plurality of network nodes and associated with a common data channel, and transmitting the assigned RNTI to the user device contention based transmissions are made possible for the user device. This is especially advantageous for user device applications transmitting small data packets in irregular time intervals. Therefore, no permanent connection to the user device is needed anymore.

In a first possible implementation form of the network node according to the second aspect as such, the transceiver is further configured to transmit a radio resource message to the user device, wherein the radio resource message indicates specific time-frequency radio resources of the common data channel to be used by the user device.

The first possible implementation form of the second aspect has the advantage that the user device knows exactly which radio resources of the common data channel to use. Further, the network node can schedule the radio resources for different user devices.

In a second possible implementation form of the network node according to any of the implementation forms of the second aspect or the second aspect as such, the transceiver is further configured to transmit the radio resource message to the user device in response to a reception of the radio resource request message from the user device, wherein the radio resource request message indicates requested radio resources by the user device.

The second possible implementation form of the second aspect has the advantage that the user device can signal the radio resources needed for contention based transmissions and the network node can use this information for scheduling radio resources.

In a third possible implementation form of the network node according to the first or the second implementation forms of the second aspect, the transceiver is further configured to transmit the radio resource message via semi-persistent scheduling grants to the user device.

The third possible implementation form of the second aspect enables an easy way of dynamically allocating resources in RRC connected mode.

In a fourth possible implementation form of the network node according to any of the first, second or third implementation forms of the second aspect, the transceiver is further configured to transmit the radio resource message by using distributed uplink grant cyclic redundancy check (CRC) parity bits scrambled with a common RNTI of the radio communication network.

The fourth possible implementation form of the second aspect enables common RNTI assignment to all user devices that knows the common assigned RNTI.

In a fifth possible implementation form of the network node according to any of the implementation forms of the second aspect or the second aspect as such, the transceiver is further configured to transmit a RNTI control message to the user device, wherein the RNTI control message indicates one or more instructions in the group comprising: maintain the assigned RNTI, renew the assigned RNTI, and release the assigned RNTI.

The fifth possible implementation form of the second aspect has the advantage that network node can have better control over the assigned RNTIs by using RNTI control messages.

In a sixth possible implementation form of the network node according to any of the implementation forms of the second aspect or the second aspect as such, the transceiver is further configured to transmit data to or receive data from the user device when the user device is connected to the network node;

release the connection to the user device, while maintaining the assigned RNTI for the user device;

transmit data to or receive data from the user device on the common data channel using the assigned RNTI, after releasing the connection to the user device.

The RNTI can be assigned to the user device from the network node, when the user device connects to the network node.

The sixth possible implementation form of the second aspect enables the user device to create a connection, get identification (RNTI) needed for data transmissions and utilize the common data channel with the assigned RNTI in non-connected mode. Thereby, e.g. energy saving is possible since transmissions in connected mode consume more power than compared to the non-connected mode.

According to a third aspect of the invention, the above mentioned and other objectives are achieved by a method in a user device for a wireless communication system, the method comprising:

receiving an assigned Radio Network Temporary Identifier (RNTI) from a radio communication network, wherein the assigned RNTI is valid for a plurality of network nodes of the radio communication network and associated with a common data channel of the radio communication network;

transmitting data to or receiving data from the radio communication network, on the common data channel using the assigned RNTI.

In a first possible implementation form of the method in a user device according to the third aspect as such, the method further comprises receiving a radio resource message from the radio communication network, wherein the radio resource message indicates specific time-frequency radio resources of the common data channel;

transmitting data to or receive data from the radio communication network, on the indicated specific time-frequency radio resources.

In a second possible implementation form of the method in a user device according to the first implementation form of the third aspect, the method further comprises transmitting a radio resource request message to the radio communication network, wherein the radio resource request message indicates requested radio resources; and receiving the radio resource message from the radio communication network in response to transmitting the radio resource request message.

In a third possible implementation form of the method in a user device according to any of the implementation forms of the third aspect or the third aspect as such, the common data channel is a dedicated non-scheduled common data channel.

In a fourth possible implementation form of the method in the user device according to any of the implementation forms of the third aspect or the third aspect as such, the method further comprises transmitting a transmission mode message to the radio communication network, wherein the transmission mode message indicates that the user device requests to transmit data to or receive data from the radio communication network, on the common data channel using the assigned RNTI.

In a fifth possible implementation form of the method in a user device according to any of the implementation forms of the third aspect or the third aspect as such, the user device further comprises a dedicated buffer, and wherein the method further comprises using the dedicated buffer for storing data before transmission on the common data channel using the assigned RNTI.

In a sixth possible implementation form of the method in a user device according to any of the implementation forms of the third aspect or the third aspect as such, the method further comprises receiving a RNTI control message from the radio communication network, wherein the received RNTI control message indicates one or more instructions in the group comprising: maintain the assigned RNTI, renew the assigned RNTI, and release the assigned RNTI; and maintaining, renew or release the assigned RNTI according to the indication in the received RNTI control message.

In a seventh possible implementation form of the method in a user device according to any of the implementation forms of the third aspect or the third aspect as such, the method further comprises transmitting data to or receive data from the radio communication network when being connected to the radio communication network;

releasing the connection to the radio communication network; and transmitting data to or receive data from the radio communication network, on the common data channel using the assigned RNTI, when not being connected to the radio communication network anymore.

According to a fourth aspect of the invention, the above mentioned and other objectives are achieved by a method in a network node for a wireless communication system, the method comprising:

assigning a Radio Network Temporary Identifier (RNTI) to a user device, wherein the RNTI is valid for a plurality of network nodes of a radio communication network and associated with a common data channel of the radio communication network;

transmitting data to or receiving data from the user device, on the common data channel using the assigned RNTI for identifying the user device.

In a first possible implementation form of the method in a network node according to the fourth aspect as such, the method further comprises transmitting a radio resource message to the user device, wherein the radio resource message indicates specific time-frequency radio resources of the common data channel to be used by the user device.

In a second possible implementation form of the method in a network node according to any of the implementation forms of the fourth aspect, the method further comprises transmitting the radio resource message to the user device in response to a reception of the radio resource request message from the user device, wherein the radio resource request message indicates requested radio resources by the user device.

In a third possible implementation form of the method in a network node according to the first or the second implementation forms of the fourth aspect, the method further comprises transmitting the radio resource message via semi-persistent scheduling grants to the user device.

In a fourth possible implementation form of the method in a network node according to any of the first, second or third implementation forms of the fourth aspect, the method further comprises transmitting the radio resource message by using distributed uplink grant CRC parity bits scrambled with a common RNTI of the radio communication network.

In a fifth possible implementation form of the method in a network node according to any of the implementation forms of the fourth aspect or the fourth aspect as such, the method further comprises transmitting a RNTI control message to the user device, wherein the RNTI control message indicates one or more instructions in the group comprising: maintain the assigned RNTI, renew the assigned RNTI, and release the assigned RNTI.

In a sixth possible implementation form of the method in a network node according to any of the implementation forms of the fourth aspect or the fourth aspect as such, the method further comprises transmitting data to or receive data from the user device when the user device is connected to the network node;

releasing the connection to the user device, while maintaining the assigned RNTI for the user device;

transmitting data to or receive data from the user device on the common data channel using the assigned RNTI, after releasing the connection to the user device.

The advantages of the methods in a network node and in a user device are the same as those for the corresponding device claims.

It is further noted that the present invention also relates to a wireless communication system comprising at least one network node and at least one user device according to the present invention.

Further, a corresponding method in a wireless communication system comprises the method in the network node and the method in the user device.

The present invention also relates to a computer program with a program code for performing a method according to any method according to the second aspect, when the computer program runs on a computer. Further, the invention also relates to a computer program product comprising a computer readable medium storing said mentioned computer program thereon. Said computer readable medium program comprises one or more of: ROM (read-only memory), PROM (programmable read-only memory), EPROM (erasable programmable read-only memory), Flash memory, EEPROM (electrically erasable programmable read-only memory) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

In LTE, the user equipment performs synchronization and Random Access (RA) procedure to get the Radio Resource Control (RRC) connected state established. However, future mobile applications are requiring more and more connectivity and for small occasional data chunks. It is a quite slow and resource consuming process to get synchronized, getting Radio Network Temporary Identifier (RNTI) and getting resources allocated for sending few bits of occasional data.

For improving conventional solutions in the art, embodiments of the present invention relate to a user device and a network node. With embodiments of the present invention contention based data transmissions in e.g. both RRC Connected mode and RRC Idle mode is enabled. A new common data channel for contention based data transmission is defined herein also called contention based transmission channel.

The contention based transmission channel is equivalent to the common data channel associated with the present assigned RNTI valid for a plurality of network nodes of a radio communication network. Further, contention based transmission(s) means transmission using the present assigned RNTI on the common data channel.

Figure 1:
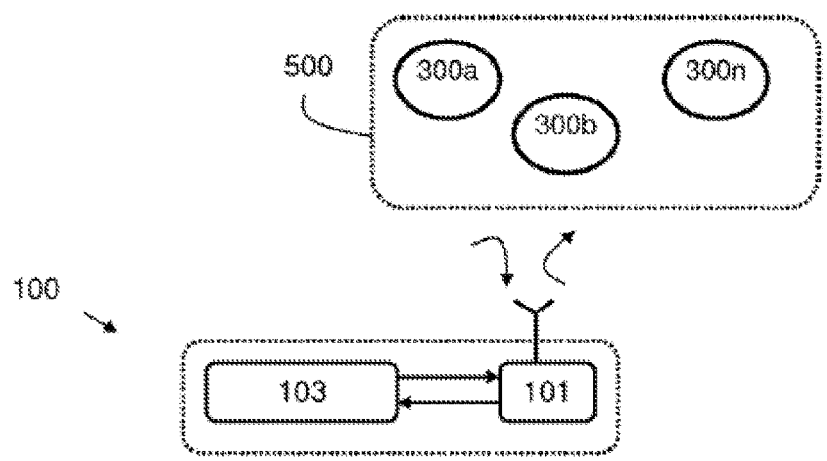
FIG. 1 shows a user device according to an embodiment of the present invention in communication with several network nodes according to embodiments of the present invention.

FIG. 1 shows a user device 100 according to an embodiment of the present invention. The user device 100 comprises a transceiver 101 which is configured to receive an assigned RNTI, from a radio communication network 500. The assigned RNTI is valid for a plurality of network nodes 300a, 300b, . . . , 300n of the radio communication network 500. The assigned RNTI is further associated with a common data channel of the radio communication network 500. The transceiver 101 is further configured to transmit data to or receive data from the radio communication network 500 on the common data channel using the assigned RNTI. Hence, before using contention based transmissions, the user device 100 acquires from the radio communication network 500 the assigned RNTI, which is then used for the contention based (unscheduled) transmissions in the common data channel. The RNTI is uniquely assigned to the user device in a certain cluster (or sets) of network nodes and for use in the common data channel. In other words, in a different cluster or set of network nodes (e.g. in a different geographical region) the same RNTI may be assigned to a different user device for use in the same common data channel. Furthermore, according to further embodiments, the same RNTI may even be assigned to two or more different user device at the same network node(s) but for a use in different common data channels. Thereby, it can be ensured that by the combination of the RNTI and the common data channel used for transmission, the user device can be unambiguously identified.

The user device 100 can be configured to receive the assigned RNTI during a connecting establishment procedure with the radio communication network 500. Additionally or alternatively the user device 100 can be configured to receive the assigned RNTI during a connection release (e.g. when the user device indicated to the radio communication network (e.g. to a network node 300a, 300b, . . ., 300n) that it wishes to communicate using the common shared channel. The network nodes 300a, 300b, . . . , 300n can be configured accordingly.

In an embodiment of the present invention, the user device 100 further comprises a dedicated buffer 103 as shown in FIG. 1. The buffer 103 is communicably coupled to the transceiver 101 and the transceiver 101 is further configured to use the dedicated buffer 103 for storing data before transmission on the common data channel using the assigned RNTI. Data to be transmitted in a connected mode can be stored in a separate buffer of the user device 100.

Hence, the user device 100 can have separate uplink (UL) buffer for contention based data transmission so that non-urgent data packets are differentiated from normal data packets. The data packets for contention based transmissions can be sent using contention based transmission grants from the radio communication network 500 and the user device 100 would not use Scheduling Request/Buffer Status Report (SR/BSR), etc., for the data packets in the dedicated buffer 103. However, the user device 100 can move low priority data packets to a conventional UL buffer if the user device 100 constantly fails to use contention based radio resources (e.g. because the common data channel is overloaded). The Medium Access Control (MAC) level timer and/or counter could be utilized in this respect. For the user device 100 it is a trade-off between energy efficiency and performance to choose between contention based transmissions or scheduled transmission, which can be managed by internal policies in the user device 100.

The radio communication network 500 may also signal transmission parameters to the user device 100 that limits the rate that a user device 100 is allowed to send data packets using the contention based transmissions (or access). This could be done either as a cell wide policy signalled over a broadcast channel or directly to a specific user device 100 in e.g. RRC signalling. For example, if the radio communication network 500 notices congestion on the contention based transmission channel (i.e. the common data channel), the radio communication network 500 can adjust user device's aggressiveness for re-attempts or time period after the user device 100 starts using radio resources of the contention based channel. For example, after n unsuccessful attempts the user device 100 can request scheduled radio resources instead, which is described in more detail in the following disclosure. The value n could be dynamically adjusted by the radio communication network 500 e.g. with control signalling or RRC parameters. Reattempts and new data sending interval aggressiveness could be controlled by e.g. contention back-off commands, which could control user device's aggressiveness on the contention based channel. It could give single back-off command or adjust randomly chosen back-off timer value space according to current congestion situation on the contention based channel.

Figure 2:
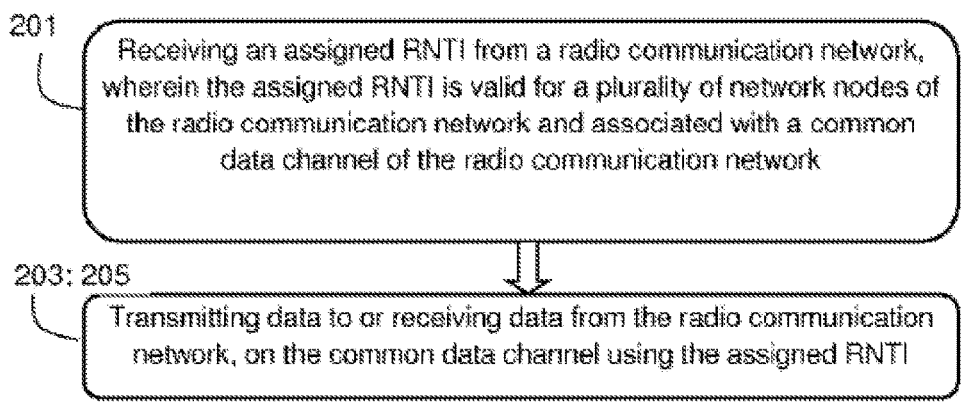
FIG. 2 shows a flow chart of a method in a user device according to an embodiment of the present invention.

Furthermore, FIG. 2 shows a flow chart of a method in a user device 100 according to an embodiment of the present invention. The method in the user device 100 comprises receiving 201 an assigned RNTI from a radio communication network 500, wherein the assigned RNTI is valid for a plurality of network nodes 300a, 300b, . . . , 300n of the radio communication network 500 and associated with a common data channel of the radio communication network 500. The method further comprises transmitting data 203 to or receiving data 205 from the radio communication network 500, on the common data channel using the assigned RNTI.

Figure 3:
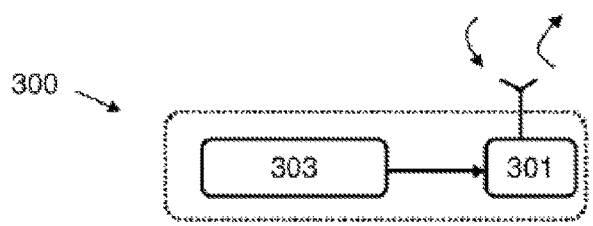
FIG. 3 shows a network node according to an embodiment of the present invention.

FIG. 3 shows a network node 300 according to an embodiment of the present invention. The network node 300 comprises a transceiver 301 and a processor 303. The processor 303 is configured to assign a RNTI to a user device 100 (not shown in FIG. 3), wherein the assigned RNTI is valid for a plurality of network nodes 300a, 300b, . . . , 300n of a radio communication network 500 and associated with a common data channel of the radio communication network 500. The transceiver 301 of the network node 300 is configured to transmit the assigned RNTI to the user device 100. The transceiver 301 is further configured to transmit data to or receive data from the user device 100, on the common data channel using the assigned RNTI for identifying the user device 100.

Figure 4:
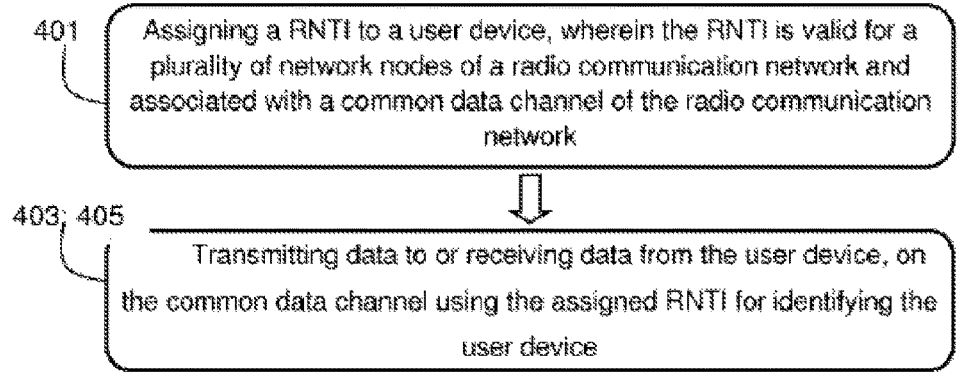
FIG. 4 shows a flow chart of a method in a network node according to an embodiment of the present invention.

FIG. 4 shows a flow chart of a method in a network node according to an embodiment of the present invention. The method comprises assigning 401 a RNTI to a user device 100, wherein the RNTI is valid for a plurality of network nodes 300a, 300b, . . . , 300n of a radio communication network 500 and associated with a common data channel of the radio communication network 500. The method further comprises transmitting data 403 to or receiving data 405 from the user device 100, on the common data channel using the assigned RNTI for identifying the user device 100.

Figure 5:
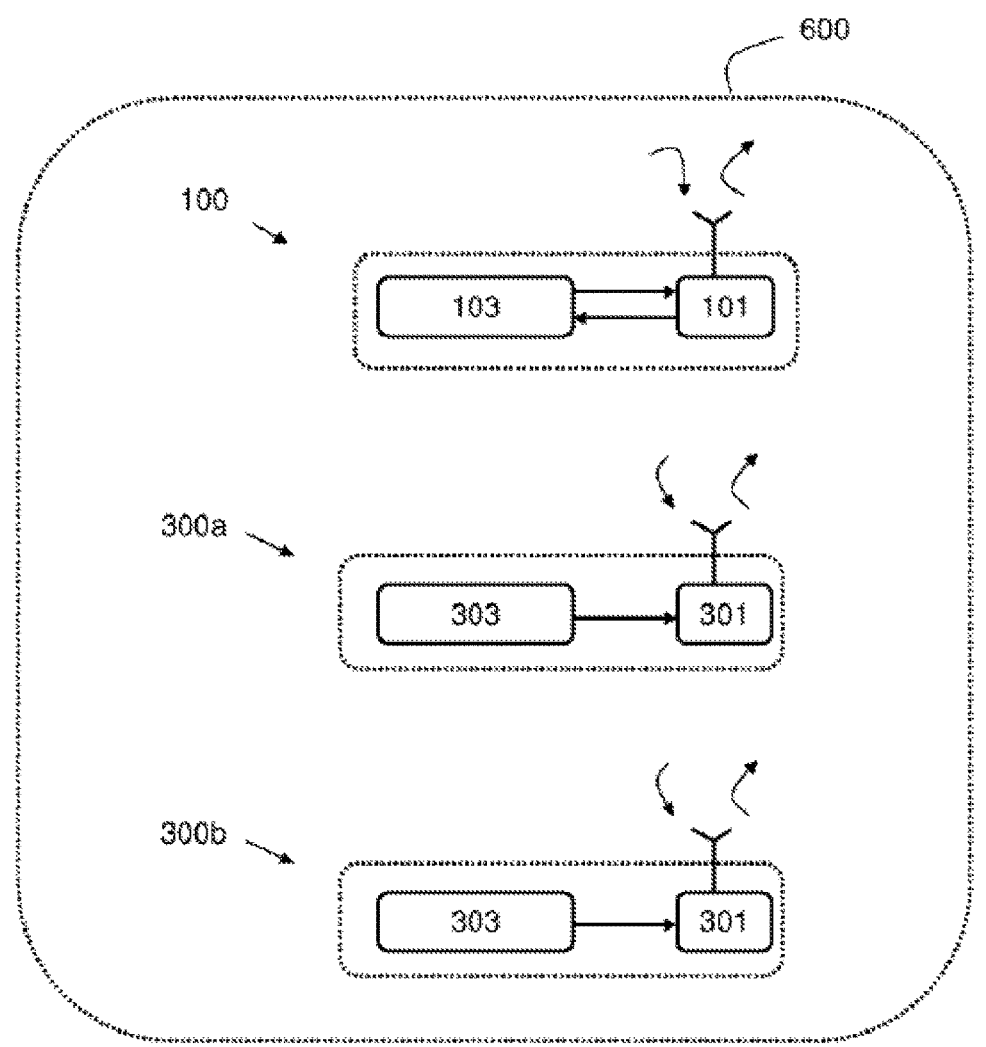
FIG. 5 shows a wireless communication system comprising embodiments of the present invention.

FIG. 5 shows a wireless communication system 600 comprising embodiments of the present invention. In FIG. 5 a user device 100 and two network nodes 300a, 300b are shown. The first network node 300a, of a radio communication network 500, transmits an assigned RNTI to the user device 100. The assigned RNTI is valid for a plurality of network nodes and in this example for network nodes 300a, 300b. The user device 100 receives the assigned RNTI and transmits and/or receives data to or from the radio communication network 500 using the assigned RNTI on the common data channel. The first network node 300a and/or the second network node 300b can transmit and/or receive data to or from the user device 100 using the assigned RNTI on the common data channel. It can be the same network node that transmits the assigned RNTI to the user device 100 that also communicates with the user device 100. However, it is also possible that one network node (e.g. network node 300a in FIG. 5) transmits the assigned RNTI and another network node (e.g. network node 300b in FIG. 5) communicates with the user device 100. Hence, the network nodes 300a, 300b of the radio communication network 500 are configured to exchange the assigned RNTI to achieve that the RNTI is valid for a plurality of network nodes of the radio communication network 500.

The problem of identifying the user device 100 that makes contention based transmissions can be solved by allocation and maintenance of the assigned RNTI at the network node 300 for an extended period so that the user device 100 can use the assigned RNTI for the contention based transmission. By managing the number of user devices that are allocated such assigned RNTIs (with permission to use the contention based channel) the network node 300 can prevent the performance to degrade due to overload of the radio communication network 500.

In an embodiment of the present invention, the transceiver 101 of the user device 100 is further configured to receive a radio resource message from the radio communication network 500. The radio resource message indicates specific time-frequency radio resources of the common data channel to be used by the user device 100, i.e. messages for allocating or granting physical radio resources for a specific user device or a group of user devices. The transceiver 101 of the user device 100 is further configured to transmit data to or receive data from the radio communication network 500, on the indicated specific time-frequency radio resources.

In an embodiment of the present invention, the transceiver 101 of the user device 100 is further configured to transmit a radio resource request message to the radio communication network 500. The radio resource request message indicates requested radio resources. The transceiver 101 is further configured to receive the radio resource message described above from the radio communication network 500 in response to transmitting the radio resource request message. By using radio resource request messages identification of the radio resources to be used for contention based transmissions are possible by the user device 100.

In an embodiment of the present invention, the transceiver 301 of the network node 300 is configured to transmit a radio resource message to the user device 100. In an embodiment of the present invention, the transceiver 301 of the network node 300 is further configured to transmit the radio resource message to the user device 100 in response to a reception of the radio resource request message from the user device 100 described above.

The radio resource message may be transmitted (signalled) by the radio communication network 500 in a number of different ways. According to embodiments of the present invention:

The radio resource message may be transmitted via Semi-Persistent Scheduling (SPS) grants to the user device 100. For example, reusing signalling that is used in RRC connected mode, SPS grants could be used for defining resources for contention based data transmissions so the user device 100 would not have to send Scheduling Request (SR) and receive allocations for occasional small transmissions. For example, there are invalid Resource Indication Values (MV), which are acquired from the Downlink Control Information (DCI) formats. These currently invalid RIV values could be used for separating normal SPS grant from contention based grant. Additionally, e.g. Transmit Power Control (TPC) command, modulation and coding scheme values in DCI format 0 could be utilized, since fixed values of those shall be utilized for transmission. Once the user device 100 has received the contention based SPS allocation, the user device 100 can try to send data on persistently allocated occasions and in case of failure change used Physical Resource Block (PRB) set and maybe wait until certain predicted or random back-off time has passed to prevent further collisions;

The radio resource message may be transmitted by using distributed uplink grant CRC parity bits scrambled with a common RNTI of the radio communication network 500. In this approach the network node 100 makes uplink grants from "left over" resources and scramble CRC parity bits with a common static contention based RNTI value from unused RNTI value space (e.g. CB-RNTI (Contention Based RNTI)=FFFC (a 16 bit hex number which is not currently allocated to any specific RNTI in LTE)). Those radio resources could be then available for all user devices 100 monitoring the Physical Downlink Control Channel (PDCCH) at the time for contention based data transmissions. If user device 100 does not know the exact RNTI value the user device 100 cannot decode the grant.

In an embodiment of the present invention, the transceiver 101 of the user device 100 is further configured to transmit a transmission mode message to the radio communication network 500. The transmission mode message indicating that the user device 100 requests to transmit data to or receive data from the radio communication network 500, on the common data channel using the assigned RNTI. The transmission mode message allows the user device 100 to request to use the contention based transmission mode. The radio communication network may follow this request from the user device, or it may decide to use a different mode for the user device 100, e.g. if the contention based resources are insufficient. However, this transmission mode message gives the user device a possibility to inform the radio communication network about its preference which is not available in current radio communication networks.

In an embodiment of the present invention, the transceiver 101 of the user device 100 is further configured to receive a RNTI control message from the radio communication network 500. Therefore, the transceiver 301 of the network node is further configured to transmit the RNTI control message to the user device 100.

The received RNTI control message indicates one or more instructions in the group comprising: maintain the assigned RNTI, renew the assigned RNTI, and release the assigned RNTI. The transceiver 101 is further configured to maintain, renew or release the assigned RNTI according to the indication in the received RNTI control message. Thereby, the radio communication network 500, via network nodes, can control the use of the assigned RNTI by the user device 100. The radio communication network may instruct a user device to release the RNTI in order to reuse it for another user device, or in order to reduce the number of user devices in the contention based transmission mode. The assigned RNTIs may also be valid for a limited time, and need to be renewed when the time expires. This may be implemented using timers, which invalidate the RNTI unless any control message has arrived before the timer expires. Having limited validity time for RNTI assignments prevents RNTIs to be locked if user devices disappear from the communication system unexpectedly.

Furthermore, the user device 100, by means of the present contention based transmissions (using the assigned RNTI and the common data channel), can communicate with the radio communication network 500 also when not being connected to the radio communication network 500. This can be achieved by maintaining the assigned RNTI for the user device 100 when the connection has been released.

In current systems, such as LTE, a user device specific C-RNTI value for scrambling can only be used in RRC connected state. However, embodiments of the present invention are based on the idea that the present assigned RNTI (for a plurality of network nodes and associated with a common data channel) can be utilized for contention based data transmission after the eNB (network node) has released the RRC connection to the user device 100.

Figure 6:
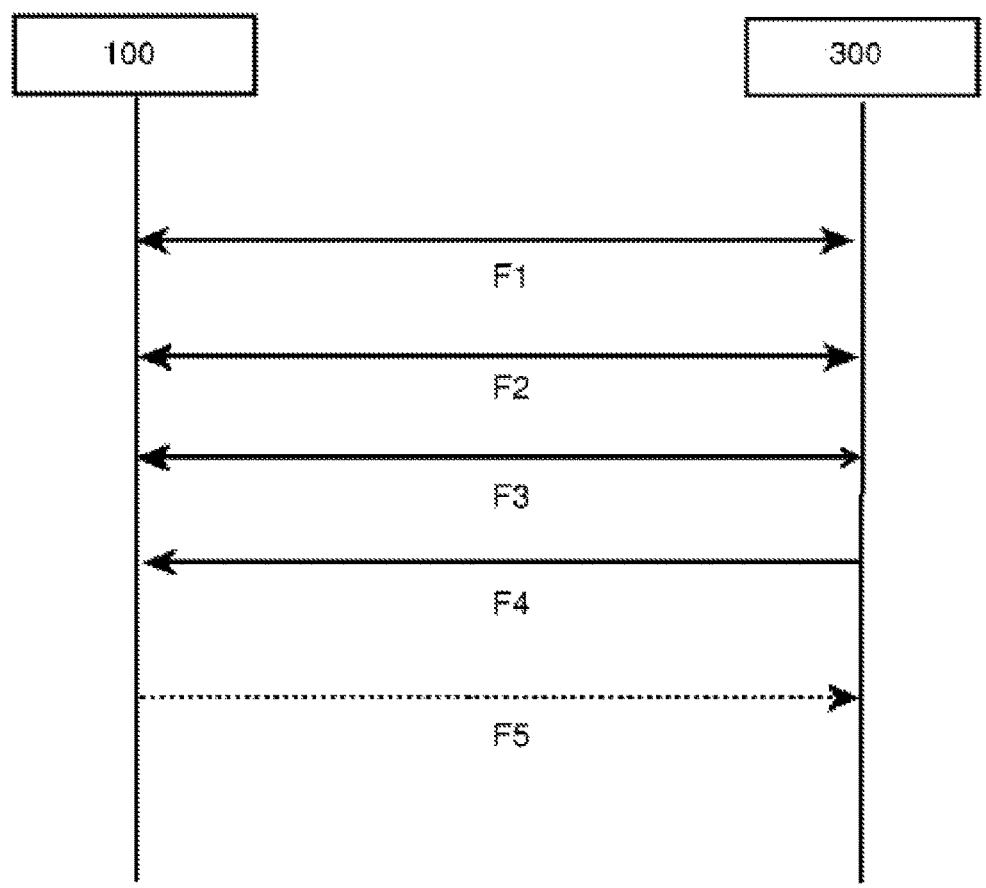
FIG. 6 illustrates a communication procedure between a user device and a network node according to an embodiment of the present invention.

Since the assigned RNTI may have limited length (e.g. 16 bits long) the number of user devices that are assigned an RNTI should be limited. Permission for using the assigned RNTI for contention-based transmission after connection release can be signalled to the user device 100 in e.g. a RRC Connection Release message. Hence, procedure for getting assigned RNTI and using the assigned RNTI in a LTE system could go as follows with reference to FIG. 6:

F1, initial synchronization to the network node 300 by the user device 100;

F2, Master Information Block/System Information Block (MIB/SIB) decoding and initial Random Access procedure to get an assigned RNTI;

F3, RRC connection setup, establishment of an RRC connection, and possible exchange of data between the user device 100 and the network node 300 (in the connected mode);

F4, RRC connection release, but the assigned RNTI stays assigned to user device 100;

F5, the user device transmits and/or receives data on the common data channel using the assigned RNTI in non-connected mode.

It should be taken into account that a user device 100 may not have timing advance so UL timing for contention based data cannot be too tight and therefore guard periods could be aligned with cell radius.

Additionally, there could be inactivity timers after which the assigned RNTI value should be renewed through RA. This is because the network node 300 might not know when the assigned RNTI value can be reused. Another possibility is that the network node 300 signals to the user device 100 when it has to renew the assigned RNTI which has been described above. The network node 300 could then manage the RNTI address pool efficiently so that it always has available identifiers for new user devices, without unnecessarily limiting the time a user device 100 can use the assigned RNTI.

For occasional downlink (DL) data transmissions to the user device 100, the user device 100 could monitor a physical DL control channel (e.g. the PDCCH) every now and then as it listens anyway due to paging. It would also be possible to assign the DL resources to be monitored in the same way as resources for the UL are assigned and thereby re-use the assigned RNTI used in the UL signalling also for the DL signalling.

If a user device 100 has a valid assigned RNTI in the RRC contention state (after the release of the RRC connection), the DL data transmissions utilizing some defined discontinuous reception (DRX) cycle or utilize paging cycle should not be a problem. This defined monitoring cycle during RRC idle mode could also be used by the network node 300 to signal to the user device 100 if the assigned RNTI is revoked or has to be renewed. This would allow the network node 300 to revoke the contention based transmission admission for some user devices to avoid overload on the common data channel, which is known to cause decreasing throughput for contention based transmissions.

UL power control for contention based data transmissions could be set quite similarly as for the Physical Uplink Shared Channel (PUSCH), i.e. amount of used radio resources and path-loss could be taken into account among network configured power control parameters.

To make data transmissions possible in contention based transmission mode it would be beneficial to specify the before mentioned transmission mode message. The transmission mode message from the user device 100 to the radio communication network 500 may indicate that the user device 100 requests to transmit data to or receive data from the radio communication network 500, on the common data channel using the assigned RNTI.

The transmission mode message may also comprise release message from the user device 100 to the network node 300 for RRC connection release and indicating that the user device 100 wants to remain in the contention based mode. Then the user device 100 could release the RRC connection (with the release message) and use only contention based data transmissions for occasional small data traffic; or the RRC connection could be released by the network node 300 if the common data channel is considered better for a particular user device 100. Also in this case the network node 300 would send a release message (already comprising an RNTI) to the user device 100 requesting the user device 100 to use the contention based transmission.

As mentioned above the RRCConnectionRelease message in 3GPP TR 36.331 can be extended with a new release message indicating that the user device 100 shall remain in contention based transmission mode. In addition new information elements containing information about the radio resources to use for contention based transmissions can be included together with a list of the network nodes (or cells) where contention based transmission is allowed.

In the simplest case the radio resources to be used for contention based transmissions are statically allocated and could either be broadcasted in the system information, or be indicated to the user device 100 during the RRC connection release which leads to the user device 100 entering the contention based transmission mode.

By dedicated RRC signalling, the network node 300 can assign separate radio resources, e.g. carriers, subcarriers or time slots, for different user devices or groups of user devices to avoid collisions. Such separation of groups of user devices also allows the reuse of the assigned RNTIs over different groups, since the resource used by a user device gives an implicit identification of the group the user device belongs to.

The assignment of these radio resources can either be made explicit (e.g. time, frequency, antenna port, etc.) or can be made in a two-step approach, where the user device 100 is assigned to a certain common data channel and where the physical radio resources for this common data channel is signalled separately. As one example, the user device 100 can be assigned to use contention based channel number 4, and where the radio communication network 500 defines the physical radio resources used by this common data channel in a separate step (e.g. which time slot this common data channel is transmitted in). The latter would allow for neighbouring network nodes to use different physical radio resources for the same common data channel which may be beneficial in case the assigned RNTI is valid for the same common data channel in multiple network nodes (but in different physical resources).

A user device 100 can try to avoid collisions by utilizing some sensing mechanisms, such as random physical resource block (PRB) selection, back-off timer, etc. If a certain user device 100 cannot get its low priority packets through via the common data channel, the user device 100 can go back to RRC connected mode and request dedicated uplink radio resources.

Embodiments of the present user device 100 according to the present invention may be any wireless communication device with the capabilities to communicate with a radio communication network, such as user equipments in LTE systems. The user device 100 can e.g., be a laptop, mobile phone, tablet computer, smart phone, etc.

Embodiments of the network node 300 according to the present invention may be a network control node or a network node of a radio communication network but can also be part of the core network of the wireless communication system 600. The network control node could e.g., be a NodeB in a radio access network or a logical node in core network, such as the operation administration maintenance (OAM) node in an LTE system, a Mobility Management Entity (MME), or a radio control node.

Some aspects of embodiments of the present invention shall be summarized in the following.

Some embodiments provide a wireless communication system 600 with a plurality of cells serving one or more user devices. As an example, each cell can be controlled by a base station (such as the network node 300). The resources available in the cell can be divided into a set of physical resources (such as subcarriers or carriers). Some of the said physical resources in each cell are used for contention based communication (using the assigned RNTI and the common data channel(s)) and some are used for contention free communication. Said cells in the wireless communication system 600 can be divided into clusters of cells, each cluster being a subset of all cells in the wireless communication system 600.

According to an embodiment, the networks nodes assign an identity (the RNTI) to a user device, where this identity is valid and unique in one of said cluster of cells and in a group of resources being a subset of said resources used for contention based communication.

According to a further embodiment, this RNTI is used by the networks nodes 300a, 300b, . . . , 300n to distinguish different user devices using said resource for contention based communication.

According to a further embodiment, the assignment contains information about the validity of said identity (RNTI).

According to a further embodiment, said information about the validity specifies at least one of: said cluster of cells, a group of resource being a subset of said resources used for contention based communication, a time, and a geographical area.

According to a further embodiment, where said network nodes 300a, 300b, . . . , 300n serving cells in said cluster of cells exchange information to guarantee that only one user device is assigned the same said unique identity for use in a common data channel.

According to a further embodiment, the network nodes 300a, 300b, . . . , 300n broadcast information mapping from said group of resources to the corresponding set of said physical resources.

According to a further embodiment said identity (RNTI) is signalled form the network node 300 to the user device 100 in a message.

According to a further embodiment said message is a message releasing dedicated resources reserved for said user device 100.

Furthermore, any method according to the present invention may be implemented in a computer program, having a program code, which when run by processing means causes the processing means to execute the steps of the method. The computer program is stored in a computer readable medium of a computer program product. The computer readable medium may comprises of essentially any memory, such as a ROM (read-only memory), a PROM (programmable read-only memory), an EPROM (erasable programmable read-only memory), a flash memory, an EEPROM (electrically erasable programmable read-only memory), or a hard disk drive.

Moreover, it is realized by the skilled person that the present devices, network node device and user device, comprise communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, digital signal processors (DSPs), mixed signal devices (MSDs), Trellis Coded Modulation (TCM) encoder, TCM decoder, power supply units, power feeders, communication interfaces, communication protocols, etc. which are suitably arranged together for performing the present solution.

Especially, the processors of the present transmitter device may comprise, e.g., one or more instances of a central processing unit (CPU), a processing unit, a processing circuit, a processor, an application-specific integrated circuit (ASIC), a microprocessor, processing means, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims. Additionally, statements made herein characterizing the invention refer to an embodiment of the invention and not necessarily all embodiments.

What is claimed is:

1. A user device for a wireless communication system, the user device comprising:
   a transceiver;
   a memory having processor-executable instructions stored thereon; and
   a processor, configured to execute the processor-executable instructions to facilitate:
      receiving an assigned Radio Network Temporary Identifier (RNTI) from a radio communication network, wherein the assigned RNTI is valid for a plurality of network nodes of the radio communication network and associated with a common data channel for contention based data transmission of the radio communication network, and wherein the assigned RNTI is uniquely assigned to the user device with respect to the plurality of network nodes for use in the common data channel; and
      transmitting data to or receiving data from the radio communication network on the common data channel using the assigned RNTI;
   wherein the plurality of network nodes are base stations.

2. The user device according to claim 1, wherein the processor is further configured to execute the processor-executable instructions to facilitate:
   receiving a radio resource message from the radio communication network, wherein the radio resource message indicates specific time-frequency radio resources of the common data channel; and
   transmitting data to or receiving data from the radio communication network on the indicated specific time-frequency radio resources.

3. The user device according to claim 2, wherein the processor is further configured to execute the processor-executable instructions to facilitate:

transmitting a radio resource request message to the radio communication network, wherein the radio resource request message indicates requested radio resources; and wherein reception of the radio resource message from the radio communication network is in response to transmitting the radio resource request message.

4. The user device according to claim 1, wherein the common data channel is a dedicated non-scheduled common data channel.

5. The user device according to claim 1, wherein the processor is further configured to execute the processor-executable instructions to facilitate:

transmitting a transmission mode message to the radio communication network, wherein the transmission mode message indicates that the user device requests to transmit data to or receive data from the radio communication network on the common data channel using the assigned RNTI.

6. The user device according to claim 1, further comprising:

a dedicated buffer; and wherein the processor is further configured to execute the processor-executable instructions to facilitate:

using the dedicated buffer for storing data before transmission on the common data channel using the assigned RNTI.

7. The user device according to claim 1, wherein the processor is further configured to execute the processor-executable instructions to facilitate:

receiving a RNTI control message from the radio communication network, wherein the received RNTI control message indicates one or more instructions of the following: maintain the assigned RNTI, renew the assigned RNTI, and release the assigned RNTI; and maintaining, renewing or releasing the assigned RNTI according to the indication in the received RNTI control message.

8. The user device according to claim 1, wherein the processor is further configured to execute the processor-executable instructions to facilitate:

transmitting data to or receiving data from the radio communication network while connected to the radio communication network;

releasing the connection to the radio communication network; and transmitting data to or receiving data from the radio communication network on the common data channel using the assigned RNTI after the connection to the radio communication network is released.

9. A network node for a wireless communication system, the network node comprising:

a transceiver; and a processor;

wherein the processor is configured to:

assign a Radio Network Temporary Identifier (RNTI) to a user device, wherein the RNTI is valid for a plurality of network nodes of a radio communication network and associated with a common data channel for contention based transmission of the radio communication network, and wherein the assigned RNTI is uniquely assigned to the user device with respect to the plurality of network nodes for use in the common data channel; and wherein the transceiver is configured to:

transmit the assigned RNTI to the user device; and transmit data to or receive data from the user device on the common data channel using the assigned RNTI for identifying the user device;

wherein the network node and the plurality of network nodes are base stations.

10. The network node according to claim 9, wherein the transceiver is further configured to:

transmit a radio resource message to the user device, wherein the radio resource message indicates specific time-frequency radio resources of the common data channel to be used by the user device.

11. The network node according to claim 10, wherein transmission of the radio resource message to the user device is in response to a reception of a radio resource request message from the user device, wherein the radio resource request message indicates requested radio resources by the user device.

12. The network node according to claim 10, wherein transmission of the radio resource message is via semi-persistent scheduling grants to the user device.

13. The network node according to claim 10, wherein transmission of the radio resource message uses distributed uplink grant cyclic redundancy check (CRC) parity bits scrambled with a common RNTI of the radio communication network.

14. The network node according to claim 9, wherein the transceiver is further configured to transmit a RNTI control message to the user device, wherein the RNTI control message indicates one or more instructions in the group comprising: maintain the assigned RNTI, renew the assigned RNTI, and release the assigned RNTI.

15. The network node according to claim 9, wherein the transceiver is further configured to:

transmit data to or receive data from the user device when the user device is connected to the network node;

release the connection to the user device while maintaining the assigned RNTI for the user device; and transmit data to or receive data from the user device on the common data channel using the assigned RNTI after releasing the connection to the user device.

16. A method in a user device for a wireless communication system, the method comprising:

receiving, by the user device, an assigned Radio Network Temporary Identifier (RNTI) from a radio communication network, wherein the assigned RNTI is valid for a plurality of network nodes of the radio communication network and associated with a common data channel for contention based data transmission of the radio communication network, and wherein the assigned RNTI is uniquely assigned to the user device with respect to the plurality of network nodes for use in the common data channel; and transmitting, by the user device, data to or receiving, by the user device, data from the radio communication network on the common data channel using the assigned RNTI;

wherein the plurality of network nodes are base stations.

17. A method in a network node for a wireless communication system, the method comprising:

assigning, by the network node, a Radio Network Temporary Identifier (RNTI) to a user device, wherein the RNTI is valid for a plurality of network nodes of a radio communication network and associated with a common data channel for contention based data transmission of the radio communication network, and wherein the assigned RNTI is uniquely assigned to the user device with respect to the plurality of network nodes for use in the common data channel; and transmitting, by the network node, data to or receiving, by the network node, data from the user device on the common data channel using the assigned RNTI for identifying the user device;

wherein the network node and the plurality of network nodes are base stations.

18. A non-transitory computer-readable medium having processor-executable instructions stored thereon for a user device in a wireless communication system, the processor-executable instructions, when executed, facilitating performance of the following:

receiving an assigned Radio Network Temporary Identifier (RNTI) from a radio communication network, wherein the assigned RNTI is valid for a plurality of network nodes of the radio communication network and associated with a common data channel for contention based data transmission of the radio communication network, and wherein the assigned RNTI is uniquely assigned to the user device with respect to the plurality of network nodes for use in the common data channel; and transmitting data to or receiving data from the radio communication network on the common data channel using the assigned RNTI;

wherein the plurality of network nodes are base stations.

19. A non-transitory computer-readable medium having processor-executable instructions stored thereon for a network node in a wireless communication system, the processor-executable instructions, when executed, facilitating performance of the following:

assigning a Radio Network Temporary Identifier (RNTI) to a user device, wherein the RNTI is valid for a plurality of network nodes of a radio communication network and associated with a common data channel for contention based data transmission of the radio communication network, and wherein the assigned RNTI is uniquely assigned to the user device with respect to the plurality of network nodes for use in the common data channel; and transmitting data to or receiving data from the user device on the common data channel using the assigned RNTI for identifying the user device;

wherein the network node and the plurality of network nodes are base stations.

* * * * *